United States Patent
Kulkarni et al.

(10) Patent No.: US 12,079,752 B2
(45) Date of Patent: Sep. 3, 2024

(54) SYSTEM AND METHOD FOR SCENARIO-DRIVEN OPTIMIZATION OF SOURCING COST

(71) Applicant: Tata Consultancy Services Limited, Mumbai (IN)

(72) Inventors: Devadatta Madhukar Kulkarni, Rochester Hills, MI (US); Ramakrishnan Sundaram Srinivasan, Mason, OH (US); Jeffrey David Tew, Rochester, MI (US)

(73) Assignee: Tata Consultancy Limited Services, Mumbai (IN)

( * ) Notice: Subject to any disclaimer, the term of this patent is extended or adjusted under 35 U.S.C. 154(b) by 315 days.

(21) Appl. No.: 17/524,220

(22) Filed: Nov. 11, 2021

(65) Prior Publication Data
US 2023/0147449 A1    May 11, 2023

(51) Int. Cl.
*G06Q 10/06*        (2023.01)
*G06F 16/2457*   (2019.01)
*G06N 3/04*        (2023.01)
*G06Q 10/0631*   (2023.01)

(52) U.S. Cl.
CPC . *G06Q 10/06315* (2013.01); *G06F 16/24578* (2019.01); *G06N 3/04* (2013.01)

(58) Field of Classification Search
None
See application file for complete search history.

(56) References Cited

U.S. PATENT DOCUMENTS

| | | | | |
|---|---|---|---|---|
| 2013/0159317 A1* | 6/2013 | Huang | ............... | G06F 16/245 707/E17.084 |
| 2015/0227996 A1* | 8/2015 | Luk | ............... | G06Q 10/0831 705/26.35 |
| 2022/0327439 A1* | 10/2022 | Farooq | ............... | G06Q 50/26 |

FOREIGN PATENT DOCUMENTS

| EP | 1 698 088 A2 | 9/2006 |
|---|---|---|
| KR | 10-2012-0122154 | 11/2012 |
| WO | WO 2005/057833 A2 | 6/2005 |

* cited by examiner

*Primary Examiner* — Arif Ullah
(74) *Attorney, Agent, or Firm* — Finnegan, Henderson, Farabow, Garrett & Dunner, L.L.P.

(57) ABSTRACT

Sourcing is a practice of locating and selecting entities based on set criteria. Determining most appropriate supplier entities at the lowest cost can develop a competitive advantage. However, existing sourcing techniques lack effective ways to target best suppliers for right part bundling and to efficiently optimize sourcing cost for sustained savings. Present disclosure leverages machine learning and optimization methods with technology data to provide a computationally efficient solution. Relationships between parts and corresponding attributes are obtained for parts bundling and best supplier locations are mapped for selected part bundles. A sourcing cost minimizer is used in conjunction with an iterative process to grow or limit supplier capacity by constraining award amount, bundle mix, or number of supplier entities based on multiple alternative scenarios being defined to systemically minimize cost and manage risks driven by changes in customer demand or manufacturing location.

9 Claims, 9 Drawing Sheets

SYSTEM AND METHOD FOR SCENARIO-DRIVEN OPTIMIZATION OF SOURCING COST

DESCRIPTION

Technical Field

The disclosure herein generally relates to analyzing supply chain costs using machine learning and optimization, and, more particularly, to system and method for scenario-driven optimization of sourcing cost.

Background

Supply chain management is the management of the flow of goods and services and includes all processes that transform raw materials into final products. It involves the active streamlining of a business's supply-side activities to maximize customer value and gain a competitive advantage in the marketplace. Sourcing, also known as procurement, is an important component in supply chain management. Entities that can find the most appropriate suppliers at the lowest cost can develop a competitive advantage. Scenarios that explore different combinations of inputs are useful for determining the lowest sourcing cost. However, existing sourcing techniques lack objective and effective ways to select best suppliers for right bundle of parts and to predict a target cost combined with a systematic scenario-driven approach to optimize costs. Due to the large number of part-supplier combinations, the computational run-times for optimization are quite long. This limitation bounds the number of scenarios that could be explored, reducing the efficiency of the process.

SUMMARY

Embodiments of the present disclosure present technological improvements as solutions to one or more of the above-mentioned technical problems recognized by the inventors in conventional systems. For example, in one aspect, there is provided a processor implemented method for bundling of parts, selecting corresponding suppliers, and optimizing an overall sourcing cost. This method may improve the functioning of current systems by decreasing computational run-times for optimization, saving time and computing resources, and also enabling the study of more scenarios, which in turn provides a more efficient solution. The method comprises: receiving, via one or more hardware processors, an input request from one or more entities; querying, via the one or more hardware processors, a parts repository based on the input request to identify a plurality of parts; applying, via the one or more hardware processors, a Jaccard similarity for each pair of parts from the plurality of parts by calculating a similarity score between each set of parts from the plurality of parts to obtain one or more combinations of a set of similar parts; identifying, based on the similarity score, at least one corresponding supplier from a suppliers repository and tagging the at least one corresponding supplier to each of the one or more combinations of the set of similar parts; performing, via the one or more hardware processors, a comparison between the similarity score and a threshold; identifying, via the one or more hardware processors, based on the comparison, one or more target suppliers from the one or more combinations of the set of similar parts and the at least one supplier; determining, via the one or more hardware processors, a sourcing cost for each set of similar parts corresponding to the one or more identified target suppliers based on one or more pre-defined scenarios; and optimizing, via the one or more hardware processors, a total sourcing cost derived from the sourcing cost for each set of similar parts based on one or more constraints.

In an embodiment, the one or more pre-defined scenarios comprise at least one of (i) an overall cost reduction for a specific combinatorial set of parts and one or more corresponding target suppliers, (ii) at least one potential supplier identified for fulfilling parts to a specific entity under pre-defined quantity bounds, (iii) at least one potential supplier identified for fulfilling parts to a specific entity at a given spend opportunity, (iv) a maximum number of potential suppliers identified for delivery across entities, or (v) combinations thereof.

In an embodiment, the one or more constraints comprise at least one of demand, a maximum quantity of parts, a minimum quantity of parts, a maximum spend, and a maximum number of suppliers.

In an embodiment, the method further comprises predicting a target cost for subsequent time instances using a Neural Network AutoRegressive with eXogenous input (NNARX) model; wherein the NNARX model comprises of at least three layers, wherein a first input layer comprises neurons representing historical values of the cost, current and historical value for external driver variables, a final output layer comprises a neuron representing the target cost, and at least one middle layer that comprises neurons configured to compute nodal weights of the NNARX model with a rectified linear activation function, wherein each node of the middle layer is connected to one or more nodes of the input layer and to a node of the output layer; splitting the input data into a training set and a testing set; fitting the NNARX model on the training set; using the resulting model on the testing set to compute predicted costs and the forecast error (measured through Mean Absolute Percentage Error or MAPE); and using the model with forecast error less than 5% to predict a target cost for subsequent time instances; performing a comparison of (i) the target cost predicted for the subsequent time instances and (ii) the optimized sourcing cost for each of the one or more pre-defined scenarios; and identifying a focal scenario from the one or more pre-defined scenarios based on the comparison, wherein the focal scenario serves as an output.

In an embodiment, the method further comprises iteratively performing, until the optimized total sourcing cost of the focal scenario is less than or equal to the target cost: identifying one or more potential objective improvements; modifying at least one of (i) cost associated with each part, and (ii) the one or more constraints; and obtaining a new optimized cost for the focal scenario based on the modified cost and the one or more constraints.

In another aspect, there is a system provided for bundling of parts, selecting corresponding supplier, and optimizing an overall sourcing cost. The system comprises a memory storing instructions; one or more communication interfaces; and one or more hardware processors coupled to the memory via the one or more communication interfaces, wherein the one or more hardware processors are configured by the instructions to: receive an input request from one or more entities; query a parts repository based on the input request to identify a plurality of parts; apply a Jaccard similarity for each pair of parts from the plurality of parts by calculating a similarity score between each set of parts from the plurality of parts to obtain one or more combinations of a set of similar parts; identify, based on the similarity score, at least one corresponding supplier from a suppliers repository and tag the at least one corresponding supplier to each of the one or more combinations of the set of similar parts; perform a comparison between the similarity score and a threshold; identify based on the comparison, one or more target suppliers from the one or more combinations of the set of similar parts and the at least one supplier; determine a sourcing cost for each set of similar parts corresponding to the one or more identified target suppliers based on one or more pre-defined scenarios; and optimize a total sourcing cost derived from the sourcing cost for each set of similar parts based on one or more constraints.

In an embodiment, the one or more pre-defined scenarios comprise at least one of (i) an overall cost reduction for a specific combinatorial set of parts and one or more corresponding target suppliers, (ii) at least one potential supplier identified for fulfilling parts to a specific entity under pre-defined quantity bounds, (iii) at least one potential supplier identified for fulfilling parts to a specific entity at a given spend opportunity, (iv) a maximum number of potential suppliers identified for delivery across entities, or (v) combinations thereof.

In an embodiment, the one or more constraints comprise at least one of demand, a maximum quantity of parts, a minimum quantity of parts, a maximum spend, and a number of suppliers.

In an embodiment, the one or more hardware processors are further configured by the instructions to predict a target cost for subsequent time instances using a Neural Network AutoRegressive with eXogenous input (NNARX) model; wherein the NNARX model comprises of at least three layers, wherein a first input layer comprises neurons representing historical values of the cost, current and historical value for exogenous or external driver variables, a final output layer comprises a neuron representing the target cost, and at least one middle layer that comprises neurons configured to compute nodal weights of the NNARX model with a rectified linear activation function, wherein each node of the middle layer is connected to one or more nodes of the input layer and to a node of the output layer; perform a comparison of (i) the target cost predicted for the subsequent time instances and (ii) the optimized sourcing cost for each of the one or more pre-defined scenarios; and identify a focal scenario from the one or more pre-defined scenarios based on the comparison, wherein the focal scenario serves as an output.

In an embodiment, the one or more hardware processors are further configured by the instructions to iteratively perform, until the optimized total sourcing cost of the focal scenario is less than or equal to the target cost: identifying one or more potential objective improvements; modifying at least one of (i) cost associated with each part, and (ii) the one or more constraints; and obtaining a new optimized cost for the focal scenario based on the modified cost and the one or more constraints.

In yet another aspect, there are provided one or more non-transitory machine-readable information storage mediums comprising one or more instructions which when executed by one or more hardware processors cause a method for bundling of parts, selecting corresponding supplier, and optimizing an overall sourcing cost. The method comprises: receiving, via one or more hardware processors, an input request from one or more entities; querying, via the one or more hardware processors, a parts repository based on the input request to identify a plurality of parts; applying, via the one or more hardware processors, a Jaccard similarity for each pair of parts from the plurality of parts by calculating a similarity score between each set of parts from the plurality of parts to obtain one or more combinations of a set of similar parts; identifying, based on the similarity score, at least one corresponding supplier from a suppliers repository and tagging the at least one corresponding supplier to each of the one or more combinations of the set of similar parts; performing, via the one or more hardware processors, a comparison between the similarity score and a threshold; identifying, via the one or more hardware processors, based on the comparison, one or more target suppliers from the one or more combinations of the set of similar parts and the at least one supplier; determining, via the one or more hardware processors, a sourcing cost for each set of similar parts corresponding to the one or more identified target suppliers based on one or more pre-defined scenarios; and optimizing, via the one or more hardware processors, a total sourcing cost derived from the sourcing cost for each set of similar parts based on one or more constraints.

In an embodiment, the one or more pre-defined scenarios comprise at least one of (i) an overall cost reduction for a specific combinatorial set of parts and one or more corresponding target suppliers, (ii) at least one potential supplier identified for fulfilling parts to a specific entity under pre-defined quantity bounds, (iii) at least one potential supplier identified for fulfilling parts to a specific entity at a given spend opportunity, (iv) a maximum number of potential suppliers identified for delivery across entities, or (v) combinations thereof.

In an embodiment, the one or more constraints comprise at least one of demand, a maximum quantity of parts, a minimum quantity of parts, a maximum spend, and a number of suppliers.

In an embodiment, the method further comprises predicting a target cost for subsequent time instances using a Neural Network AutoRegressive with eXogenous input (NNARX) model; wherein the NNARX model comprises of at least three layers, wherein a first input layer comprises neurons representing historical values of the cost, current and historical value for external driver variables, a final output layer comprises a neuron representing the target cost, and at least one middle layer that comprises neurons configured to compute nodal weights of the NNARX model with a rectified linear activation function, wherein each node of the middle layer is connected to one or more nodes of the input layer and to a node of the output layer; performing a comparison of (i) the target cost predicted for the subsequent time instances and (ii) the optimized sourcing cost for each of the one or more pre-defined scenarios; and identifying a focal scenario from the one or more pre-defined scenarios based on the comparison, wherein the focal scenario serves as an output.

In an embodiment, the method further comprises iteratively performing, until the optimized total sourcing cost of the focal scenario is less than or equal to the target cost: identifying one or more potential objective improvements; modifying at least one of (i) cost associated with each part, and (ii) the one or more constraints; and obtaining a new optimized cost for the focal scenario based on the modified cost and the one or more constraints.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
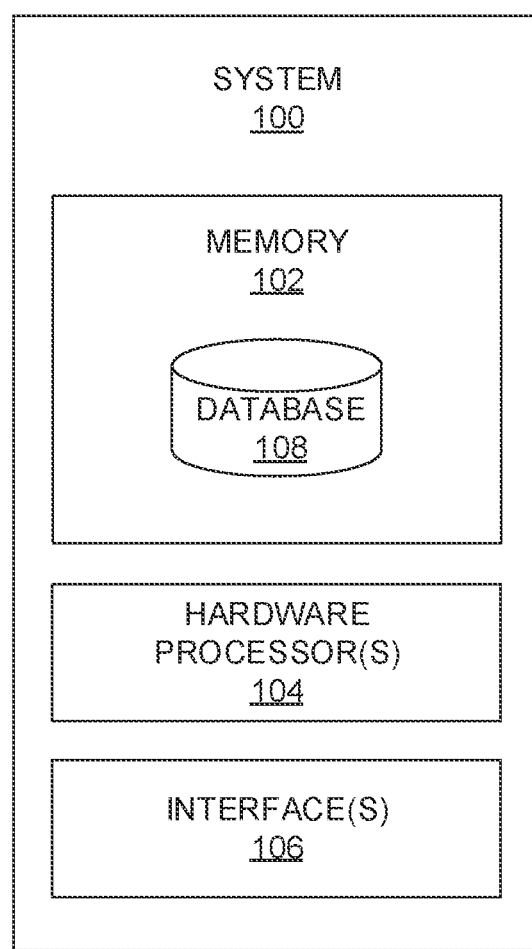
FIG. 1 depicts an exemplary system for bundling of parts, selecting corresponding suppliers, and optimizing an overall sourcing cost, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

As mentioned above, supply chain management refers to flow of goods and services and includes all processes that transform raw materials into final products. This involves an active streamlining of a supply-side activities to maximize customer value and gain a competitive advantage in the marketplace. Sourcing, also known as procurement, is a practice of locating and selecting individuals/entities based on set criteria. Sourcing is carried out in many different areas and for different reasons. Entities that can find the most appropriate suppliers at the lowest cost can develop a competitive advantage. Scenarios that explore different combinations of inputs are useful for determining the lowest sourcing cost. Due to the large number of part-supplier combinations, the computational run-times for optimization are quite long. This limitation bounds the number of scenarios that could be explored, reducing the efficiency of the process. However, existing sourcing techniques lack effective ways to target best suppliers for right bundle of parts and to systematically negotiate best contract terms for sustained savings.

Embodiments of the present disclosure address the above technical problem by providing a system and method for bundling of parts, selecting corresponding supplier, and optimizing an overall sourcing cost by leveraging detailed data about technology and future volume expectations for critical parts for future product portfolio along with clear mix of needs for capacity and capability along with cost structures across supplier locations. A part bundler creates best families of parts with shared technology attributes while a target supplier selector maps best supplier locations for selected part bundles. An iterative target cost seeker is further implemented by the system of the present disclosure that uses the sourcing cost optimizer including multiple alternatives, for example, to grow or limit supplier capacity by constraining award amount, bundle mix, or number of suppliers. The process can systematically manage risks driven by changes in customer demand or manufacturing location.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

FIG. 1 depicts an exemplary system 100 for bundling of parts, selecting corresponding supplier, and optimizing an overall sourcing cost, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface devices) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information input request type(s), parts repository, Jaccard similarity score for the parts, and the like. The database 108 further comprises information on (i) set of similar parts that are combined, (ii) suppliers' repository, (iii) selection of corresponding supplier, target suppliers, sourcing cost, optimized sourcing cost for the input request(s), and the like. The database 108 further comprises data for one or more constraints and one or more pre-defined scenarios that are used for optimizing the sourcing cost, wherein each scenario is a digital representation of alternative, yet unique combinations of input types and values. Further, the database 108 comprises information corresponding to focal scenario identified from the one or more pre-defined scenarios, one or more potential objective improvements, cost of each part being modified to obtain new modified cost for each of the parts, and the like. Moreover, the memory 102 comprises one or more modules such as part bundler, sourcing cost optimizer, target supplier selector, target cost estimator, Neural Network AutoRegressive with eXogenous input (NNARX) model, iterative target cost seeker, and the like. The above-mentioned modules are implemented as at least one of a logically self-contained part of a software program, a self-contained hardware component, and/or, a self-contained hardware component with a logically self-contained part of a software program embedded into each of the hardware component that when executed perform the method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
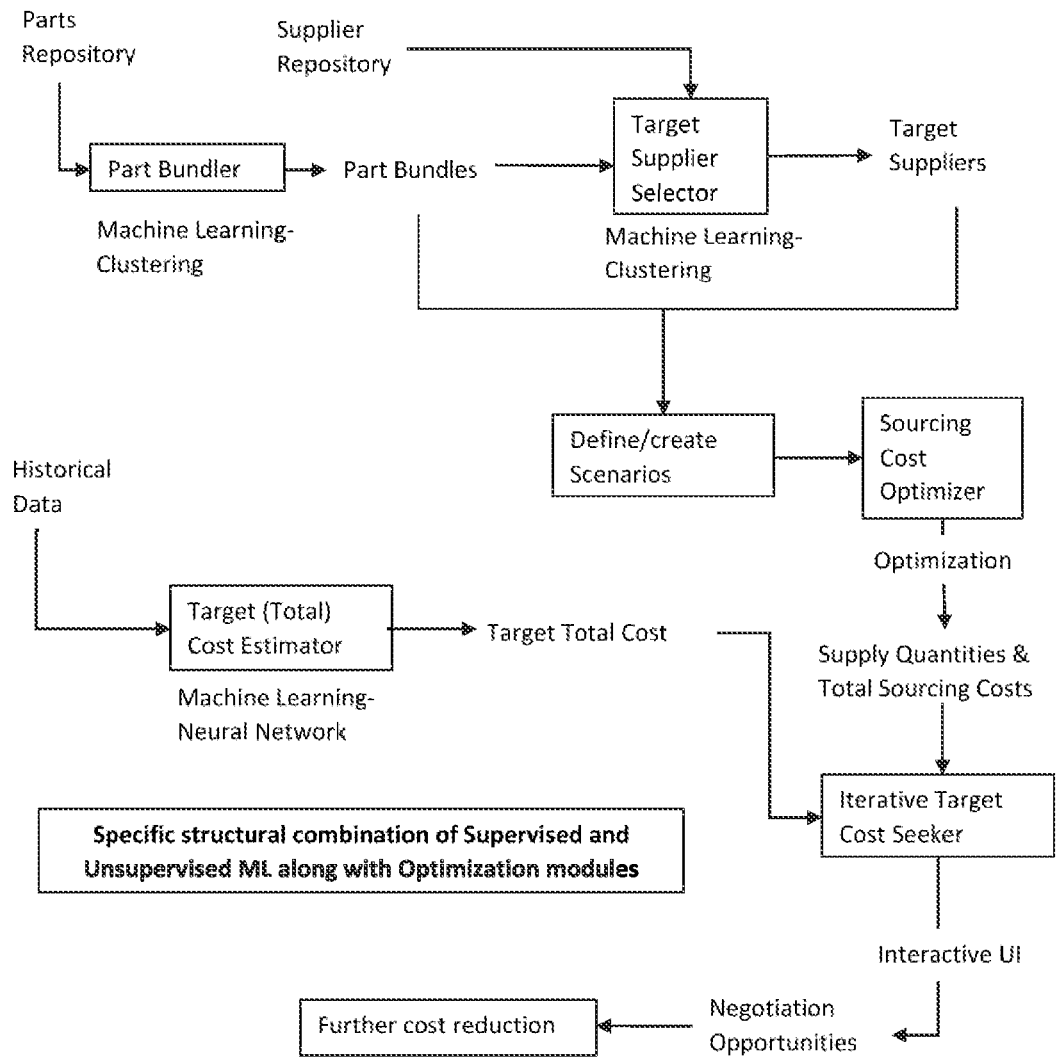
FIG. 2 depicts an exemplary high level block diagram of the system of FIG. 1, for bundling of parts, selecting corresponding supplier, and optimizing an overall sourcing cost, in accordance with an embodiment of the present disclosure.

FIG. 2, with reference to FIG. 1, depicts an exemplary high level block diagram of the system 100 of FIG. 1, for bundling of parts, selecting corresponding supplier, and optimizing an overall sourcing cost, in accordance with an embodiment of the present disclosure. As mentioned in FIG. 1, the components/modules as depicted in FIG. 2 are comprised in the memory 102 and invoked for execution to perform the method described herein.

Figure 3:
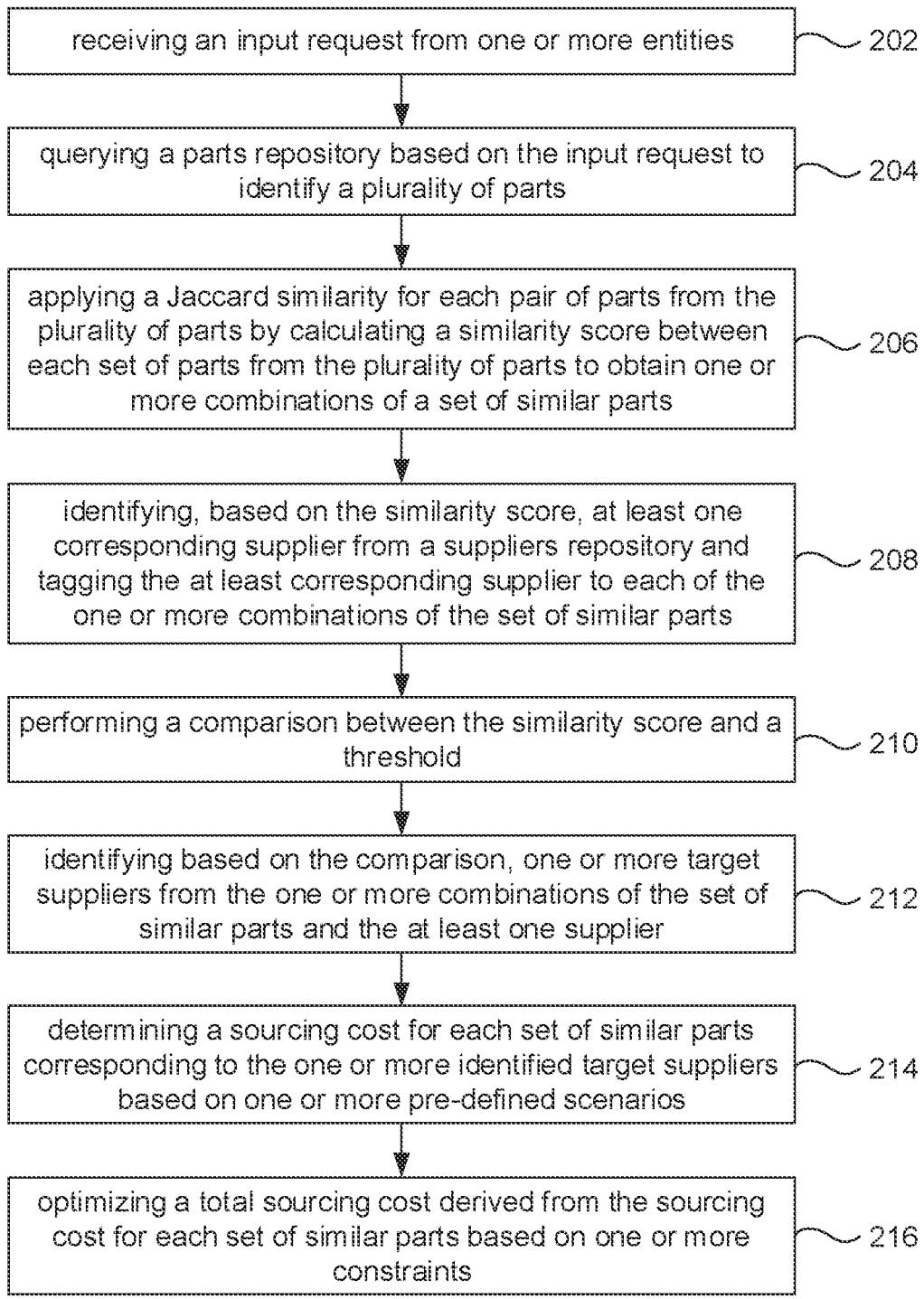
FIG. 3 depicts an exemplary flow chart illustrating a method for bundling of parts, selecting corresponding supplier, and optimizing an overall sourcing cost, using the systems of FIG. 1-2, in accordance with an embodiment of the present disclosure.

FIG. 3, with reference to FIGS. 1-2, depicts an exemplary flow chart illustrating a method for bundling of parts, selecting corresponding supplier, and optimizing an overall sourcing cost, using the systems of FIG. 1-2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2, the flow diagram as depicted in FIG. 3, and FIGS. 4 through 9. In an embodiment, at step 202 of the present disclosure, the one or more hardware processors 104 receive an input request from one or more entities (e.g., an individual customer, a business organization (or a B2B entity), and the like). The input request corresponds to purchase of one or more parts. The one or more parts may correspond to any object type. The parts for example may be corresponding to machine(s), consumer products, vehicle component(s), manufacturing units, assembly unit(s), and the like. It is to be understood by a person having ordinary skill in the art or person skilled in the art that the above examples of parts shall not be construed as limiting the scope of the present disclosure.

Upon receiving the input request, at step 204 of the present disclosure, the one or more hardware processors 104 query a parts repository based on the input request to identify a plurality of parts. Parts repository contains parts list, corresponding material, process, geometric features, tolerance, surface finish specifications, and the like. System queries the repository to get the total list of parts that need to be sourced. Below Table 1 depicts an exemplary plurality of parts being identified from the parts repository:

TABLE 1

| Part ID | Part Family | Part Name | Material Family | Material | Geometric Feature1 | Geometric Feature n | Tolerance Grade | Finish Grade | Process Category | Process 1 | Process n |
|---|---|---|---|---|---|---|---|---|---|---|---|
| 0 | Shaft | Solid Shaft | Metal | Steel | Cylindrical | | Medium Tolerance | Fine Finish | Machining | Turning | |
| 1 | Shaft | Hollow Shaft | Metal | Aluminum | Cylindrical | | Medium Tolerance | Medium Finish | Machining | Turning | |
| 2 | Gear | Spur Gear | Metal | Steel | Cylindrical | Gear Teeth | Fine Tolerance | Medium Finish | Machining | Turning | Gear Cutting |

Figure 4:
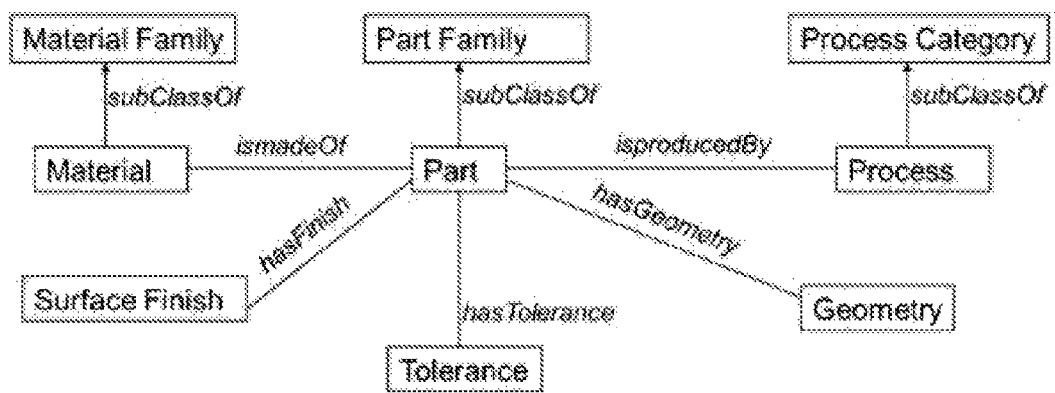
FIG. 4 depict an exemplary representation of parts ontology, in accordance with an embodiment of the present disclosure.

In an embodiment, at step 206 of the present disclosure, the one or more hardware processors 104 apply a Jaccard similarity for each pair of parts from the plurality of parts by calculating a similarity score between each set of parts from the plurality of parts to obtain one or more combinations of a set of similar parts. In other words, a similarity score between each set of parts (or each pair or parts) from the plurality of parts is calculated to obtain one or more combinations of a set of similar parts. The above step 206 is better understood by way of following description:

Part bundling may be accomplished by using a parts' ontology that contains the various attributes from the parts data. Parts may be bundled using an unsupervised machine learning method for clustering as known in the art, based on a high similarity coefficient, e.g., computed using Jaccard's method. The part ontology used for bundling is shown in FIG. 4. More specifically, FIG. 4, with reference to FIGS. 1 through 3, depicts an exemplary representation of parts ontology, in accordance with an embodiment of the present disclosure.

Jaccard's similarity may be calculated as the ratio: $J_{(A,B)} = \frac{|A \cap B|}{|A \cup B|}$ (1)

In the above equation (1), numerator is the number of common attributes (intersection) between 2 parts A and B and the denominator is the total number of unique attributes (union) between the 2 parts A and B. For example, considering Part IDs 0 and 1, the common attributes are: Shaft, Metal, Cylindrical, Medium Tolerance, Machining, and Turning, i.e., 6 common attributes. The unique attributes between Part IDs 0 and 1 are: Shaft, Solid Shaft, Metal, Steel, Cylindrical, Medium Tolerance, Fine Finish, Machining, Turning, Grinding, Hollow Shaft, Aluminum, Hole, Medium Finish, and Drilling, giving a total of 15 attributes. The Jaccard similarity score is $=6/15=0.4$. Similarly, the similarity score for Part 1 and Part 2 is $(7/17)=0.412$ and for Part 0 and Part 2 is $(5/18)=0.278$. Next the system constructs a pairwise distance matrix, where distance=(1−Jaccard similarity score). For the above example, the distance matrix is as shown below in Table 2.

TABLE 2

|    | P0 | P1  | P2    |
|----|----|-----|-------|
| P0 | —  | 0.6 | 0.722 |
| P1 |    | —   | 0.588 |
| P2 |    |     | —     |

Interpretation: Least distance is between Parts 1 and 2, which indicates these parts are the most similar. These form the first bundle. Similarly, bundling of parts is carried out till all parts are included in one big bundle. The results are stored in a linkage matrix as shown below in Table 3.

TABLE 3

| 1st part | 2nd part | Distance | NumParts |           |
|----------|----------|----------|----------|-----------|
| P1       | P2       | 0.588    | 2        | => Forms P3 |
| P0       | P3       | 0.722    | 3        |           |

Figure 5:
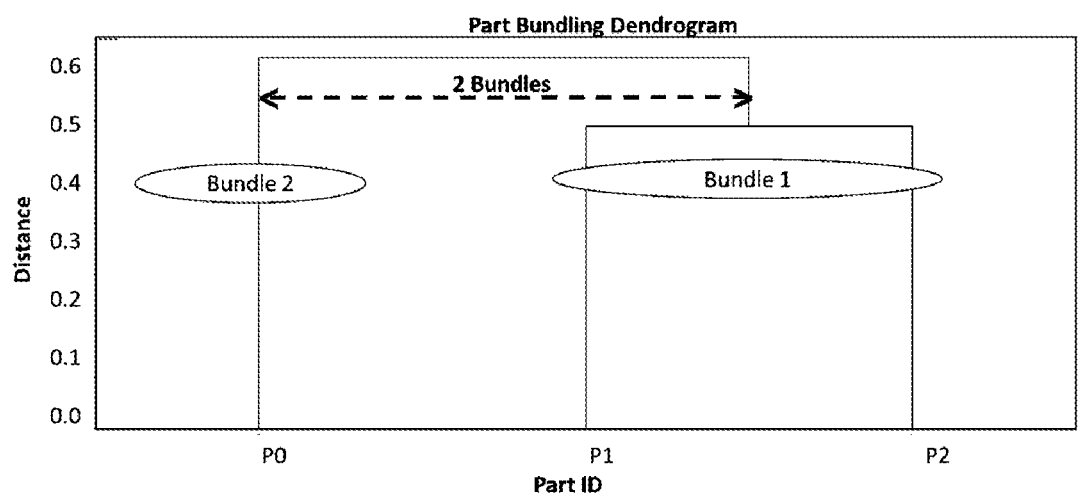
FIG. 5 depicts a dendrogram illustrating a result of parts bundling, in accordance with an embodiment of the present disclosure.

The system 100 forms part bundles by grouping parts with the smallest distance between them. When a group is formed that group forms a new (virtual) part (e.g., refer the first row above). The process continues till all the parts are grouped together in one big bundle. The results are best visualized by a dendrogram as depicted in FIG. 5. More specifically, FIG. 5, with reference to FIGS. 1 through 4, depicts a dendrogram illustrating a result of parts bundling, in accordance with an embodiment of the present disclosure. If a user wants to form 2 bundles, then based on the analysis, P1 and P2 form Bundle 1 and P0 forms Bundle 2, in one example embodiment of the present disclosure. The summary information following the part bundling step is shown below in Table 4:

TABLE 4

| Bundle Number | Bundle Parts | Attributes |
|---------------|--------------|------------|
| B0 | P0 | Grinding; Metal; Machining; Shaft; Turning; Solid Shaft; and Steel |
| B1 | P1; P2 | Aluminum; Shaft; Turning; Gear; Drilling; Steel; Hollow Shaft; Metal; Machining; Gear Cutting; and Spur Gear |

Figure 6:
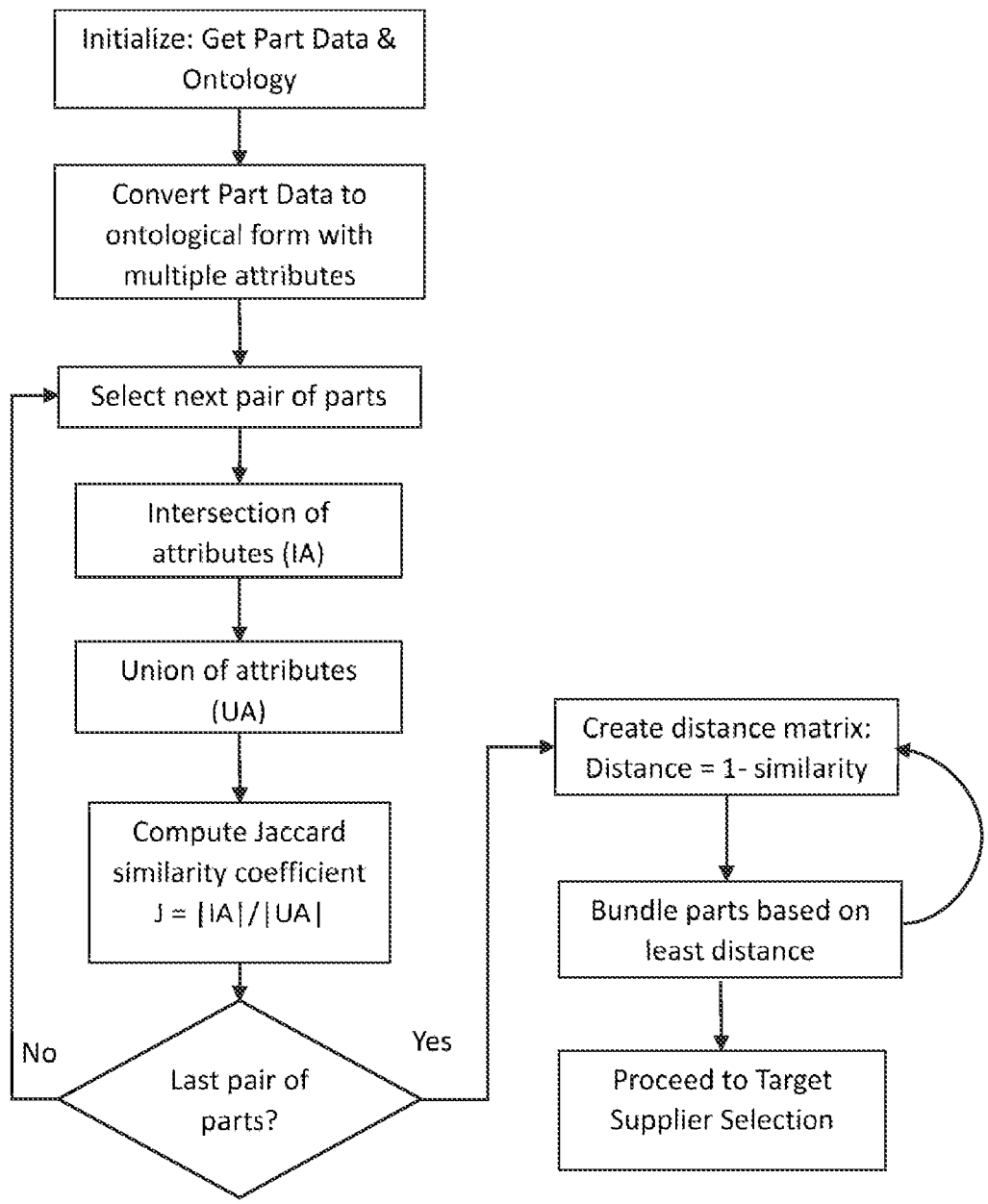
FIG. 6 depicts a flow-chart illustrating a method for obtaining one or more combinations of a set of similar parts, in accordance with an embodiment of the present disclosure.
Figure 7:
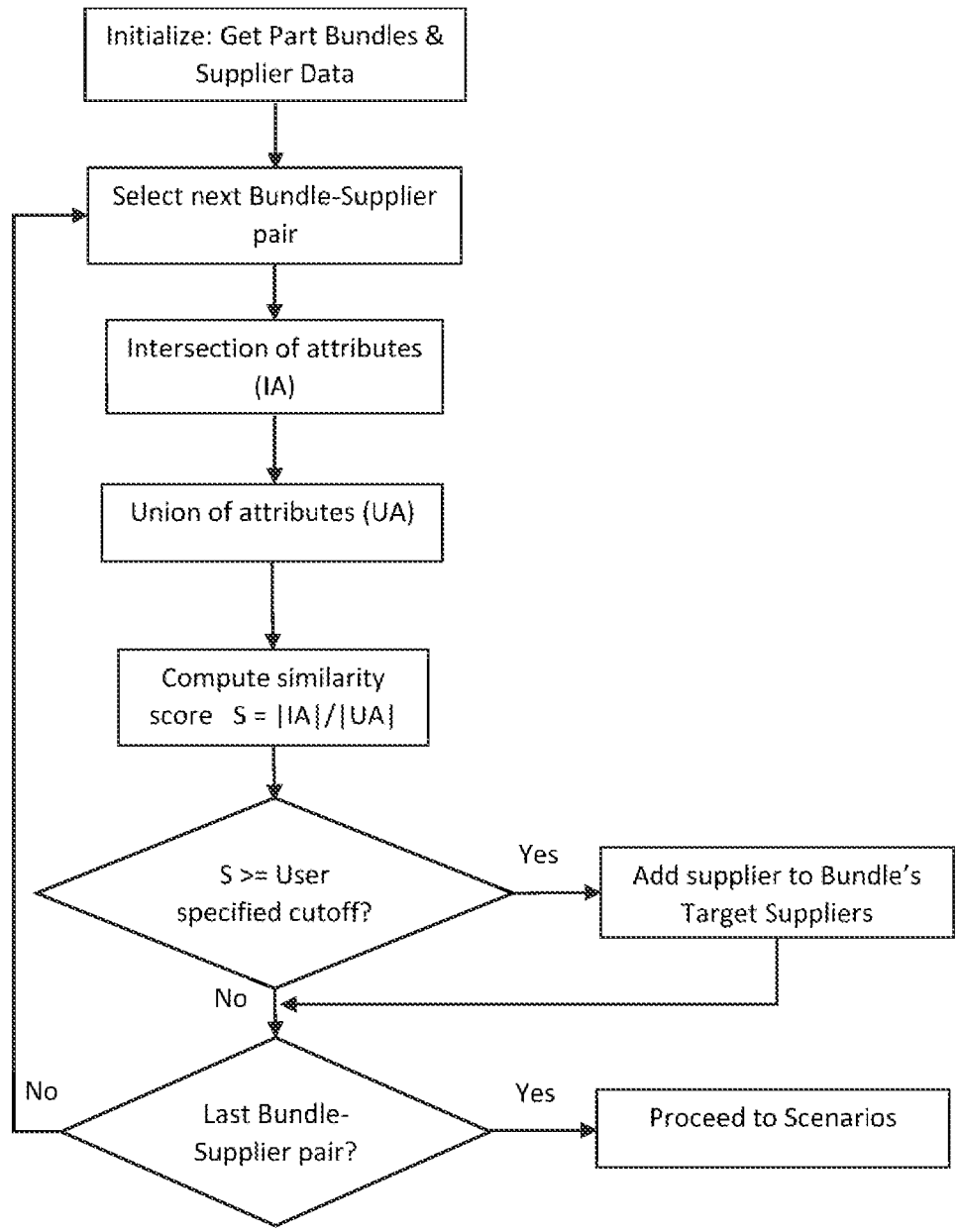
FIG. 7 depicts an exemplary flow-chart illustrating a method for selection of one or more target suppliers, in accordance with an embodiment of the present disclosure.

The above step of 206 may be better understood by way of flow-chart depicted in FIG. 6, and the above description of examples. More specifically, FIG. 6, with reference to FIGS. 1 through 5, depicts a flow-chart illustrating a method for obtaining one or more combinations of a set of similar parts, in accordance with an embodiment of the present disclosure. As can be seen from FIG. 6, initially data corresponding to parts and ontology are obtained and the parts data is converted to ontological form with multiple attributes associated therein. Next a pair of parts is selected, and intersection and union of attributes are determined accordingly. Jaccard similarity is computed based on the intersection and union of attributes for the parts. These steps are repeated until the last pair of parts. Once Jaccard similarity score is computed till the last parts pair, the distance matrix is created wherein distance=(1−Jaccard similarity score/coefficient). In other words, once the parts are retrieved from the repository, and represented with their ontological attributes, the parts are compared to each other n pairwise fashion/manner to determine the intersection attributes (IA) and the union attributes (UA) as shown in the flow-chart of FIG. 6. The Jaccard similarity coefficient is calculated as $|IA|/|UA|$. After all the pairwise similarity calculations are completed, a distance matrix is computed, where distance for each pair=(1−similarity coefficient). As this matrix is traversed, parts with the least distance between them are bundled, effectively forming a new part. This process continues till all parts are identified with a bundle.

Upon obtaining one or more combinations of a set of similar parts, at step 208 of the present disclosure, the one or more hardware processors 104 identify, based on the similarity score, at least one corresponding supplier from a suppliers' repository and tagging the at least one corresponding supplier to each of the one or more combinations of the set of similar parts. The supplier repository contains information such as a list of suppliers with location, material, processing specifications, and the like. Above information comprised in the supplier repository shall not be construed as limiting the scope of the present disclosure. Below Table 5 depicts supplier repository:

TABLE 5

| Supplier_Name | Location_State | Material Family | Material | Process Category | Process1 | Process2 | Process3 | Process4 |
|---------------|----------------|-----------------|----------|------------------|----------|----------|----------|----------|
| Indian Creek Fab | OH |  |  |  |  |  |  |  |
| Machine-Pro Tech | OH |  |  |  |  |  |  |  |
| Trumax | OH | Metal |  |  | Machining | Milling | Turning |  |
| ProFab | KY |  |  |  |  |  |  |  |
| AMT | IN |  |  |  |  |  |  |  |
| Gyro | MI | Metal | Brass |  | Machining | Milling | Turning | Drilling Screw cutting |
| Fox Valley Welding | IA | Metal | Steel | Joining | Welding | Milling | Turning | Drilling |

TABLE 5-continued

| Supplier_Name | Location_State | Material Family | Material | Process Category | Process1 | Process2 | Process3 | Process4 |
|---|---|---|---|---|---|---|---|---|
| Mainstay Mfg | IN | Metal | | Machining | Turning | Milling | Drilling | Gear Cutting |
| Carmeco | MO | Metal | | Machining | Turning | Milling | Drilling | Gear Cutting |

The target supplier selector may use an unsupervised machine learning clustering method Jaccard similarity, but it may be applied to find the similarity between each part bundle and the different suppliers, as opposed to finding the similarity between different parts. This similarity may be calculated and displayed as a "similarity score" for each bundle-supplier pair. In this process, there is a flexibility to choose which attributes to include in the similarity score calculation, by selecting only the required columns from the supplier data file. For a given bundle, the suppliers with a similarity score at least or exceeding a user-specified cutoff score may be identified as the "target suppliers" for that bundle. The above description may be better understood by way of following example:
Calculation for Supplier selection=Gyro and Bundle=B1 (P1 and P2).
Common attributes={Metal, Machining, Turning, Drilling}
Total attributes={Aluminum, Shaft, Turning, Gear, Drilling, Steel, Hollow Shaft, Metal, Machining, Gear Cutting, Spur Gear, Brass, Milling, Screw Cutting}
Similarity score=4/14=0.286

Refer to steps of FIG. 3, at step 210 of the present disclosure, the one or more hardware processors 104 perform a comparison between the similarity score and a threshold. At step 212 of the present disclosure, the one or more hardware processors 104 identify, based on the comparison, one or more target suppliers from the one or more combinations of the set of similar parts and the at least one supplier.

Thus, after completing a calculations for all other bundle-supplier combinations, the results from the target supplier selection are shown below in Table 6:

TABLE 6

| Parts | Indian Creek Fab | Machine-Pro Tech | Trumax | ProFab | AMT | Gyro | Fox Valley Welding | Mainstay Mfg | Carmeco |
|---|---|---|---|---|---|---|---|---|---|
| ['P0'] | 0 | 0 | 0.375 | 0 | 0 | 0.273 | 0.273 | 0.3 | 0.3 |
| ['P1', 'P2'] | 0 | 0 | 0.25 | 0 | 0 | 0.286 | 0.288 | 0.417 | 0.417 |

The text in bold property in some of the cells in the above Table 6 show the target suppliers for each bundle, with a user-specified cutoff value of 0.28 (e.g., the threshold). The above steps are better understood by way of steps in a flow-chart depicted in FIG. 7. More specifically, FIG. 7, with reference to FIGS. 1 through 6, depicts an exemplary flow-chart illustrating a method for selection of one or more target suppliers, in accordance with an embodiment of the present disclosure. As can be seen from FIG. 7, following part bundling, the supplier data is obtained from the supplier repository. For each bundle-supplier pair, the ratio of the intersection of attributes (IA) to the union (UA) of attributes is calculated (like what is described for bundling) to obtain a similarity score (S=IA/UA). If the similarity score is greater than a specified cut-off, the supplier is selected as a target supplier for that bundle. This process is repeated till all the bundle-supplier comparisons are completed.

Once the one or more target suppliers are identified/selected, at step 214 of the present disclosure, the one or more hardware processors 104 determine a sourcing cost for each set of similar parts corresponding to the one or more identified target suppliers based on one or more pre-defined scenarios. Upon determining the sourcing cost for each set of similar parts, a total sourcing cost is derived accordingly and then the total sourcing cost is optimized based on one or more constraints.

The one or more pre-defined scenarios, wherein each scenario is a digital representation of alternative, yet unique combinations of input types and values—comprise at least one of (i) an overall cost reduction for a specific combinatorial set of parts and one or more corresponding target suppliers, (ii) at least one potential supplier identified for fulfilling parts to a specific entity under pre-defined quantity bounds, (iii) at least one potential supplier identified for fulfilling parts to a specific entity at a given spend opportunity, (v) a maximum number of potential suppliers identified for delivery across entities, or (vi) combinations thereof. The one or more pre-defined scenarios and the one or more constraints are depicted in below Table 7 by way of examples:

TABLE 7

| Scenario No. | Constraints Category | Scenario Type | Scenario Opportunity |
|---|---|---|---|
| 1 | Awards to Supplier | Unconstrained | Opportunity assessment |
| 2 | Awards to Supplier | Minimum and Maximum Delivery | Competitive check |

TABLE 7-continued

| Scenario No. | Constraints Category | Scenario Type | Scenario Opportunity |
|---|---|---|---|
| 3 | Awards to Supplier | Minimum Delivery and Maximum Spend | Business over Time |
| 4 | Awards to Supplier and Number of suppliers | Minimum Delivery and Maximum Number of Suppliers | Plant complexity |
| 5 | Awards to Supplier and Number of suppliers | Single source and Maximum Delivery | Quality and competitive check |

TABLE 7-continued

| Scenario No. | Constraints Category | Scenario Type | Scenario Opportunity |
|---|---|---|---|
| 6 | Awards to Supplier and Number of suppliers | Single Source and Maximum Spend | Quality and Business over Time |

The selection of the one or more above-mentioned scenarios is expected to drive the negotiation focus as follows:
1. Scenario 1: What is the overall cost reduction opportunity with given part bundle & targeted suppliers?
2. Scenario 2: Which suppliers bring in the cost competitive supply within delivery bounds?
3. Scenario 3: Which suppliers can fulfill supply to a dedicated plant, given minimum delivery and maximum spend limits?
4. Scenario 4: Which suppliers can fulfill supply to a dedicated plant, given a maximum number of suppliers and minimum delivery limits?
5. Scenario 5: What is the maximum number of suppliers needed across plants for fulfilling delivery?
6. Scenario 6: Which single supplier can fulfill supply to a dedicated plant at a given spend opportunity?

Trying to capture right scenarios to select "Focal Scenario" may depend upon what business is trying to achieve through sourcing negotiation:
For example:
1. Scenario 1, 2 and 3—target suppliers to fulfill demand while selecting which supplier to grow or control or exit
2. Scenarios 1, 4, 5—explore single sourcing to "minimize plant concerns" and understand potential impact on total cost escalation
3. Scenarios 1, 2, 5 and 6—explore using minimal suppliers to ensure delivery while understanding impact on total cost escalation Each of the above pre-defined scenarios are better understood by the following exemplary description.

1. Unconstrained Scenario: In this scenario, the only constraints are the demands at the plants for specific parts. This is the base scenario.
$X_{ijk}$—quantity of bundle k shipped from supplier i to plant j (decision variables)
$C_{ijk}$—unit cost for shipping bundle k from supplier i to plant j
$D_{jk}$—demand for bundle k at plant j
The objective is to minimize total cost $$Min \Sigma_i \Sigma_j \Sigma_k X_{ijk} \cdot C_{ijk}$$

Subject to $\Sigma_i X_{ijk} \geq D_{jk} \forall j,k$ (Demand constraint)

$X_{ijk} \geq 0 \forall i,j,k$ (Non-negativity constraint)

2. Minimum and Maximum Delivery Scenario: In this scenario, in addition to demand, there are constraints on the minimum and maximum delivery quantities.
$X_{ijk}$—quantity of bundle k shipped from supplier i to plant j (decision variables)
$C_{ijk}$—unit cost for shipping bundle k from supplier i to plant j
$D_{jk}$—demand for bundle k at plant j
$MINQ_{im}$—minimum quantity of parts in category m to be purchased from supplier i
$MAXQ_{im}$—maximum quantity of parts in category m to be purchased from supplier i
The objective is to minimize total cost $$Min \Sigma_i \Sigma_j \Sigma_k X_{ijk} \cdot C_{ijk}$$

Subject to $\Sigma_i X_{ijk} \geq D_{jk} \forall j,k$ (Demand constraint)

$\Sigma_j \Sigma_{k \in m} X_{ijk} \leq MAXQ_{im} \forall i,m$ (Maximum quantity constraint)

$\Sigma_j \Sigma_{k \in m} X_{ijk} \geq MINQ_{im} \forall i,m$ (Minimum quantity constraint)

$X_{ijk} \geq 0 \forall i,j,k$ (Non-negativity constraint)

3. Minimum Delivery and Maximum Spend Scenario: In this scenario, in addition to demand, there are constraints on the minimum delivery quantity and maximum spend.
$X_{ijk}$—quantity of bundle k shipped from supplier i to plant j (decision variables)
$C_{ijk}$—unit cost for shipping bundle k from supplier i to plant j
$D_{jk}$—demand for bundle k at plant j
$MINQ_{im}$—minimum quantity of parts in category m to be purchased from supplier i
$MAXS_{im}$—maximum spend limit on parts in category m to be purchased from supplier i
The objective is to minimize total cost $$Min \Sigma_i \Sigma_j \Sigma_k X_{ijk} \cdot C_{ijk}$$

Subject to $\Sigma_i X_{ijk} \geq D_{jk} \forall j,k$ (Demand constraint)

$\Sigma_j \Sigma_{k \in m} X_{ijk} \cdot C_{ijk} \leq MAXS_{im} \forall i,m$ (Maximum spend constraint)

$\Sigma_j \Sigma_{k \in m} X_{ijk} \geq MINQ_{im} \forall i,m$ (Minimum quantity constraint)

$X_{ijk} \geq 0 \forall i,j,k$ (Non-negativity constraint)

4. Minimum Delivery and Maximum Number of Suppliers Scenario: In this scenario, in addition to demand, there are constraints on the minimum delivery quantity and maximum number of suppliers.
$X_{ijk}$—quantity of bundle k shipped from supplier i to plant j (decision variables)
$C_{ijk}$—unit cost for shipping bundle k from supplier i to plant j
$D_{jk}$—demand for bundle k at plant j
$MINQ_{im}$—minimum quantity of parts in category in to be purchased from supplier i
$MAXSUPP_{jk}$—maximum number of suppliers for bundle k to plant j
$y_{ijk}$—a binary variable=1 if supplier i ships bundle k to plant j, else=0
M—a large number such as 1,000,000
The objective is to minimize total cost $$Min \Sigma_i \Sigma_j \Sigma_k X_{ijk} \cdot C_{ijk}$$

Subject to $\Sigma_i X_{ijk} \geq D_{jk} \forall j,k$ (Demand constraint)

$\Sigma_j \Sigma_{k \in m} X_{ijk} \geq MINQ_{im} \forall i,m$ (Minimum quantity constraint)

$\Sigma_i y_{ijk} \leq MAXSUPP_{jk} \forall j,k$ (Maximum suppliers' constraint 1)

$X_{ijk} \leq y_{ijk} \cdot M \forall i,j,k$ (Maximum suppliers' constraint 2)

$y_{ijk} \in \{0,1\} \forall i,j,k$ (Binary variable constraint)

$X_{ijk} \geq 0 \forall i,j,k$ (Non-negativity constraint)

5. Single Source and Maximum Delivery Scenario: in this scenario, in addition to demand, there are constraints on having a single supplier for each delivery along with a maximum delivery quantity.

$X_{ijk}$—quantity of bundle k shipped from supplier i to plant j (decision variables)

$C_{ijk}$—unit cost for shipping bundle k from supplier i to plant j $D_{jk}$—demand for bundle k at plant j $MAXQ_{im}$—maximum quantity of parts in category in to be purchased from supplier i $y_{ijk}$—a binary variable=1 if supplier i ships bundle k to plant j, else=0

M—a large number such as 1,000,000

The objective is to minimize total cost $$Min \Sigma_i \Sigma_j \Sigma_k X_{ijk} \cdot C_{ijk}$$

Subject to $\Sigma_i X_{ijk} \geq D_{jk} \forall j,k$ (Demand constraint)

$\Sigma_j \Sigma_{k \in m} X_{ijk} \leq MAXQ_{im} \forall i,m$ (Maximum quantity constraint)

$\Sigma_i y_{ijk} \leq 1 \forall j,k$ (Single source constraint 1)

$X_{ijk} \leq y_{ijk} \cdot M \forall i,j,k$ (Single source constraint 2)

$y_{ijk} \in \{0,1\} \forall i,j,k$ (Binary variable constraint)

$X_{ijk} \geq 0 \forall i,j,k$ (Non-negativity constraint)

6. Single Source and Maximum Spend Scenario: In this scenario, in addition to demand, there are constraints on having a single supplier for each delivery along with a maximum spend limit.

$X_{ijk}$—quantity of bundle k shipped from supplier i to plant j (decision variables)

$C_{ijk}$—unit cost for shipping bundle k from supplier i to plant j $D_{jk}$—demand for bundle k at plant j $MAXS_{im}$—maximum spend limit on parts in category in to be purchased from supplier i $y_{ijk}$—a binary variable=1 if supplier i ships bundle k to plant j, else=0

M—a large number such as 1,000,000

The objective is to minimize total cost $$Min \Sigma_i \Sigma_j \Sigma_k X_{ijk} \cdot C_{ijk}$$

Subject to $\Sigma_i X_{ijk} \geq D_{jk} \forall j,k$ (Demand constraint)

$\Sigma_j \Sigma_{k \in m} X_{ijk} \cdot C_{ijk} \leq MAXS_{im} \forall i,m$ (Maximum spend constraint)

$\Sigma_i y_{ijk} \leq 1 \forall j,k$ (Single source constraint 1)

$X_{ijk} \leq y_{ijk} \cdot M \forall i,j,k$ (Single source constraint 2)

$y_{ijk} \in \{0,1\} \forall i,j,k$ (Binary variable constraint)

$X_{ijk} \geq 0 \forall i,j,k$ (Non-negativity constraint)

Below illustrated is a description on how at least some of the above scenarios are formed/pre-defined by the system 100 of the present disclosure. For the sake of brevity and for better understanding of the embodiments of the present disclosure only a few scenarios formation is shown by the system 100. It is to be understood by a person having ordinary skill in the art that such examples of defining/forming scenarios shad not be construed as limiting the scope of the present disclosure.

Scenarios explore different combinations of inputs and the corresponding output(s). For the sourcing cost minimization problem, the various inputs comprise source entities (suppliers), destination entities (plants, or production units, or manufacturing units, and the like), parts or bundles with corresponding demands, cost to supply one unit of a given part or bundle for a given source and destination, minimum/maximum limits on delivery quantity, minimum/maximum limits on spend, minimum/maximum number of suppliers, and the like. A scenario is formed by selecting and combining a specific subset of the above-mentioned inputs, in one example embodiment. Some of the inputs are required in every scenario (e.g., sources, destinations, demands, and the like), while some are optional combinations (e.g., minimum delivery quantity and maximum Spend). In general, as the number of inputs and the combinations increase, the total sourcing cost may tend to increase.

Below outlined is an example of an approach to structure selection of some of the pre-defined scenarios:

Step 1: Unconstrained Scenario sizes the total opportunity based upon supplier quotes for sourcing.

Step 2: Minimum Delivery Maximum Delivery Scenario analyzes competitiveness for individual suppliers for minimum and maximum capacities offered by suppliers. The volume allocation and associated spend of the scenario further clarifies whether the available capacities can cover the demand mix and further at what cost across parts. The negotiations between (or across) entities (or business entities such as suppliers, manufacturers, consumers, and the like) further need to consider supplier performance record and cost structures to explore what suppliers can be grown in terms of adding volume or spend, or that need to be fixed by controlling spend or capacity, or further possibly exit by reducing volume and spend.

Minimum Delivery Maximum Delivery Scenario can be further utilized by varying bounds, for example, Maximum delivery down for Exit suppliers, or Minimum delivery up for Grow suppliers, to analyze impact on total cost in terms of competitive cost that suppliers can offer.

Step 3: Minimum Delivery Maximum Spend Scenario runs by varying delivery or spend bounds can further analyze balance of volume and cost across allocations for improving opportunities across the "Grow/Fix/Exit Plan". Once optimal solutions (e.g., optimal solution refers to spend and volume allocation mix across suppliers) are compared this can drive negotiations between (or across) entities (or business entities such as suppliers, manufacturers, consumers, and the like) with better understanding of opportunities for reducing total cost and managing "Grow/Fix/Exit Plan". In other words, each of these solutions such as spend across supplier(s), and volume allocation mix across suppliers are compared to determine which of these are providing optimal results with respect to one or more strategies such as growth, fix, exit plans, etc.

The use of machine learning methods for part bundling and target supplier selection, reduces the number of decision variables in optimization, leading to a decrease in computational run-times. As mentioned above, the one or more constraints comprises at least one of demand, maximum quantity of parts, minimum quantity of parts, maximum spend, and number of suppliers. It is further to be understood by a person having ordinary skill in the art that the above pre-defined scenarios shall not be construed as limiting the scope of the present disclosure. In other words, there could be other scenarios accounted and defined in real-time/near real-time or well in advance depending upon the requirement (e.g., based on the input request from customers/users).

The above steps of 214 and 216 are better understood by way of following description. The source cost optimizer (comprised in the memory 102 and refer block diagram of the system 100 of FIG. 2) as implemented by the system 100 uses the part bundles, and the unit costs from the one or more target suppliers being identified/selected to determine the least sourcing cost for different constraints and their combinations, defined by way of scenarios. The sourcing cost may be minimized using an optimization algorithm as known in the art. The optimization problem may be setup based on the selected business objective and constraints. A simulation algorithm may be an alternative option for optimization. One example, using optimization for minimization of sourcing cost, with Minimum and Maximum Quantity Limits from select suppliers is shown below:

In this example case, the constraints are the minimum and maximum quantity of a particular category that can be purchased from a supplier, with the default values "Zero" and "Unlimited" respectively.

$X_{ijk}$—quantity of bundle k shipped from supplier i to plant j (decision variables)

$C_{ijk}$—unit cost for supplying bundle k from supplier i to plant j $D_{jk}$—demand for bundle k at plant j $MINQ_{im}$—minimum quantity of parts in category m to be purchased from supplier i $MAXQ_{im}$—maximum quantity of parts in category m to be purchased from supplier i The objective is to minimize total cost:

$$Min \Sigma_i \Sigma_j \Sigma_k X_{ijk} \cdot C_{ijk} \qquad (2)$$

Subject to the following constraints:

$$\Sigma_i X_{ijk} \geq D_{jk} \forall j,k \text{(Demand constraint)} \qquad (3)$$

$$\Sigma_j \Sigma_{k \in m} X_{ijk} \leq MAXQ_{im} \forall i,m \text{(Maximum quantity constraint)} \qquad (4)$$

$$\Sigma_j \Sigma_{k \in m} X_{ijk} \geq MINQ_{im} \forall i,m \text{(Minimum quantity constraint)} \qquad (5)$$

$$X_{ijk} \geq 0 \forall i,j,k \text{(Non-negativity constraint)} \qquad (6)$$

The output decision variable values, $X_{ijk}$ can be used to calculate the total sourcing cost, using the objective function $\Sigma_i \Sigma_j \Sigma_k X_{ijk} \cdot C_{ijk}$. This is the sumproduct of the unit costs and the quantity supplied for each supplier-part bundle-plant combination.

For sake of brevity and better understanding of the embodiments of the present disclosure, system and method associated described for the next steps use a special case, wherein each part is in a bundle by itself, and all suppliers are target suppliers for all parts. The sourcing cost optimizer uses two input files. In the files below, only data from the first few rows and columns of the data files are shown to illustrate the input and output structures and such use of data shall not be construed as limiting the scope of the present disclosure.

1) Consider LaneCosts.csv—Below Table 8 contains the following columns with mostly self-explanatory meanings.

a. Variables: $x_1$, $x_2$, $x_3$, . . . =>number of decision variables. Example in the use case scenario has 6 parts/bundles, 4 suppliers, and 4 plants, giving 96 decision variables, b. Source: Supplier c. Destination: Plant d. Part: Part or Bundle e. Cost: Unit cost to source the part or bundle from source to destination in USD f. Category: A user-defined or computed grouping of part

TABLE 8

| Variable | Source | Destination | Part | Cost | Category |
|---|---|---|---|---|---|
| $x_1$ | Marina | Detroit | P1 | 980 | Base |
| $x_2$ | Marina | Indianapolis | P1 | 980 | Base |
| $x_3$ | Marina | Cleveland | P1 | 1000 | Base |
| $x_4$ | Marina | St. Louis | P1 | 1040 | Base |
| $x_5$ | Empire | Detroit | P1 | 970 | Base |
| $x_6$ | Empire | Indianapolis | P1 | 1010 | Base |
| $x_7$ | Empire | Cleveland | P1 | 940 | Base |
| $x_8$ | Empire | St. Louis | P1 | 1060 | Base |
| $x_9$ | Lakes | Detroit | P1 | 940 | Base |
| $x_{10}$ | Lakes | Indianapolis | P1 | 930 | Base |

2) Consider Constraints.csv—Below Table 9 describes the constraints for the optimization problem. The last column (N) in each row is the RHS value of the constraint, and the (N−1)th column has the mathematical symbol for the relation for the constraint (<=, >=, =). Columns 1 through (N−2) have the constraint coefficients for the decision variables.

TABLE 9

| c1 | c2 | c3 | c4 | c5 | c6 | ... | c92 | c93 | c94 | c95 | c96 | relation | value |
|---|---|---|---|---|---|---|---|---|---|---|---|---|---|
| 1 | 0 | 0 | 0 | 1 | 0 | ... | 0 | 0 | 0 | 0 | 0 | >= | 50000 |
| 0 | 1 | 0 | 0 | 0 | 1 | ... | 0 | 0 | 0 | 0 | 0 | >= | 80000 |
| 0 | 0 | 1 | 0 | 0 | 0 | ... | 0 | 0 | 0 | 0 | 0 | >= | 30000 |
| 0 | 0 | 0 | 1 | 0 | 0 | ... | 0 | 0 | 0 | 0 | 0 | >= | 50000 |
| 0 | 0 | 0 | 0 | 0 | 0 | ... | 0 | 0 | 0 | 0 | 0 | >= | 80000 |
| 0 | 0 | 0 | 0 | 0 | 0 | ... | 0 | 0 | 0 | 0 | 0 | >= | 120000 |
| 0 | 0 | 0 | 0 | 0 | 0 | ... | 0 | 0 | 0 | 0 | 0 | >= | 50000 |
| 0 | 0 | 0 | 0 | 0 | 0 | ... | 0 | 0 | 0 | 0 | 0 | >= | 40000 |
| 0 | 0 | 0 | 0 | 0 | 0 | ... | 0 | 0 | 0 | 0 | 0 | >= | 40000 |

For each scenario, there are two main output files from the sourcing cost optimizer (among others). The first one is the value of the objective function (equation 2). This is the lowest sourcing cost that can be obtained with the constraints described in the scenario (equations 3-6). This output for the Scenario 2 (also referred as MinMaxQty) is shown below and is stored in MinMaxQty_optobj.csv (not shown in FIGS.) in the memory.

Optimum Total Cost for Sourcing–MinMaxQty=1, 962,100,000

The second output from the source cost optimizer is the value for each of the decision variables, i.e., the quantity of each supplier/part/plant combination that is needed to achieve the above minimum sourcing cost. This is stored in MinMaxQty_optout.csv and a sample is shown below in Table 10, The sum of the "total_cost" column is equal to the optimum cost of 1,962,100,000.

TABLE 10

| scenario | variable | source | destination | part | category | cost | supply_qty | total_cost |
|---|---|---|---|---|---|---|---|---|
| Min-MaxQty | $x_1$ | Marina | Detroit | P1 | Base | 980 | 0 | 0 |
| Min-MaxQty | $x_2$ | Marina | Indianapolis | P1 | Base | 980 | 0 | 0 |
| Min-MaxQty | $x_3$ | Marina | Cleveland | P1 | Base | 1000 | 0 | 0 |
| Min-MaxQty | $x_4$ | Marina | St. Louis | P1 | Base | 1040 | 0 | 0 |
| Min-MaxQty | $x_5$ | Empire | Detroit | P1 | Base | 970 | 0 | 0 |
| Min-MaxQty | $x_6$ | Empire | Indianapolis | P1 | Base | 1010 | 0 | 0 |
| Min-MaxQty | $x_7$ | Empire | Cleveland | P1 | Base | 940 | 30000 | 28,200,000 |
| Min-MaxQty | $x_8$ | Empire | St. Louis | P1 | Base | 1060 | 0 | 0 |
| Min-MaxQty | $x_9$ | Lakes | Detroit | P1 | Base | 940 | 50000 | 47,000,000 |
| Min-MaxQty | $x_{10}$ | Lakes | Indianapolis | P1 | Base | 930 | 80000 | 74,400,000 |

It is to be understood by person having ordinary skill in the art or person skilled in the art that the above mentioned pre-defined scenarios and the one or more constraints are examples, and such examples shall not be construed as limiting the scope of the present disclosure. In other words, depending upon the input request and the level of engagement and negotiations across entities, the scenarios and the one or more constraints may be configurable and modified to meet the requirements.

Figure 8:
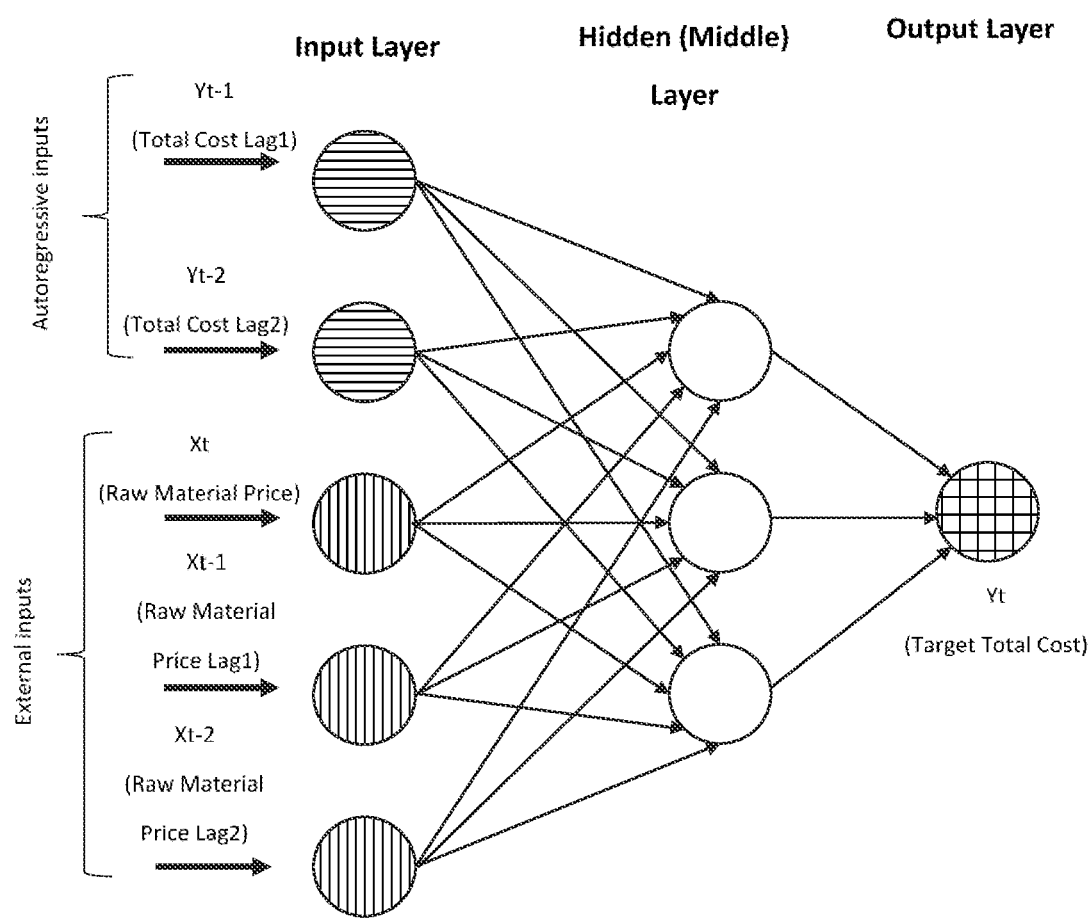
FIG. 8 depicts an exemplary representation of Neural Network AutoRegressive with eXogenous input (NNARX) model with various layers as implemented by the system of FIGS. 1-2, in accordance with an embodiment of the present disclosure.

Once the total sourcing cost is optimized, the one or more hardware processors 104 predicting a target cost for subsequent time instances using a Neural Network AutoRegressive with eXogenous input (NNARX) model (also referred as neural network or neural network model and interchangeably used herein). The NNARX model comprises of at least three layers, wherein a first input layer comprises neurons representing historical values of the cost, current and historical value for one or more external driver variables, a final output layer comprises a neuron representing the target cost, and at least one middle layer that comprises neurons configured to compute nodal weights of the NNARX model with a rectified linear activation function. Each node of the middle layer is connected to one or more nodes of the input layer (depending on the number of nodes present in the input layer) and to a node of the output layer. The above step and the neural network model may be better understood by way of following description:

Setting up the target (total) cost for scenario refinement is a key technical problem and is addressed using a Supervised Machine Learning approach wherein the present disclosure uses the Neural Network AutoRegressive with eXogenous input (NNARX) model to predict the target total cost for a current or future time period. The NNARX as implemented by the system and method of the present disclosure is depicted in FIG. 8. More specifically, FIG. 8, with reference to FIGS. 1 through 7 depicts an exemplary representation of Neural Network AutoRegressive with eXogenous input (NNARX) model with various layers as implemented by the system of FIGS. 1-2, in accordance with an embodiment of the present disclosure. More specifically, the Neural Network AutoRegressive with eXogenous input (NNARX) model has at least three layers comprising an input layer, one or more hidden layers and a final output layer. Here, in addition to the historical total (sourcing) cost, the historical raw material price (e.g., steel price) is used as an exogenous input (or external driver variable). In the neural network model, the first input layer neurons represent historical values of the cost, and current and historical value for external driver variables, the final output layer neuron represents the target cost, and the neurons in the middle layer are used for computing weights with a rectified linear activation function or ReLU. The nodes in any two consecutive layers are inter-connected as shown in the FIG. 8. After specifying the model as above, the input data is into a training set and a testing set and the NNARX model parameters are generated by fitting on the training data. More specifically, the input data is split into a training set and a testing set, wherein the NNARX model is fitted on the training set and the resulting/fitted model is used on the testing set to compute predicted costs and the forecast error (measured through Mean Absolute Percentage Error or MAPE) and the model is then used with forecast error less than 5% to predict a target cost for subsequent time instances. In other words, the generated model is used to forecast the predicted costs for the testing data. Next, the forecast error is computed as measured through Mean Absolute Percentage Error (MAPE):

$$MAPE = \sum_{Test\ data} \frac{|Predicted\ Cost - Actual\ Cost|}{Actual\ Cost}$$

The model in this case yields a forecast error of 4.56%; such forecast error shall not be construed as limiting the scope of the present disclosure. As the forecast error is less than 5% this model is used predict a target cost for subsequent time instances. A sample of input and output records are shown below in Table 11. The total cost predicted value(s) in bold text property were used in the Iterative Target Seeker method (described below).

TABLE 11

| Month | Year | Quarter | TOTAL COST (Mn USD) Actual | TOTAL COST (Mn USD) Predicted |
|---|---|---|---|---|
| January | 2015 | January 2015 | 1598.76 | 1635.66 |
| April | 2015 | April 2015 | 1453.51 | 1489.03 |
| July | 2015 | July 2015 | 1403.85 | 1413.39 |
| October | 2016 | October 2016 | 1125.48 | 1265.25 |
| January | 2016 | January 2016 | 1127.79 | 1056.27 |
| April | 2016 | April 2016 | 1698.84 | 1491.36 |
| July | 2016 | July 2016 | 1946.66 | 1850.88 |
| October | 2017 | October 2017 | 1700.70 | 1776.02 |
| January | 2017 | January 2017 | 1615.31 | 1618.80 |
| April | 2017 | April 2017 | 1698.84 | 1641.92 |
| July | 2017 | July 2017 | 1942.71 | 1761.84 |
| October | 2018 | October 2018 | 2227.89 | 2145.31 |
| January | 2018 | January 2018 | 2573.39 | 2315.16 |
| April | 2018 | April 2018 | 2847.91 | 2737.17 |
| July | 2018 | July 2018 | 3139.35 | 2942.65 |
| October | 2019 | October 2019 | 2964.86 | 2964.55 |
| January | 2019 | January 2019 | 2915.89 | 2786.40 |

TABLE 11-continued

| Month | Year | Quarter | TOTAL COST (Mn USD) Actual | TOTAL COST (Mn USD) Predicted |
|---|---|---|---|---|
| April | 2019 | April 2019 | 2761.35 | 2752.26 |
| July | 2019 | July 2019 | 2634.19 | 2601.00 |
| October | 2020 | October 2020 | 2468.98 | 2462.41 |
| January | 2020 | January 2020 | 2096.56 | 2250.09 |
| April | 2020 | April 2020 | 1957.50 | 1955.94 |

It is to be understood by a person having ordinary skill in the art that the above training and testing setup described by the system and method of the present disclosure shall not be construed as limiting the scope of the present disclosure. In other words, training and testing of the NNARX model and its fitment may vary depending on the requirements and scenarios being observed, in one example embodiment of the present disclosure.

The one or more hardware processors 104 then perform a comparison of (i) the target cost predicted for the subsequent time instances and (ii) the optimized sourcing cost for each of the one or more pre-defined scenarios; and identify a focal scenario from the one or more pre-defined scenarios based on the comparison, wherein the focal scenario serves as an output (e.g., the target cost).

A focal scenario is a scenario that is selected based on a smallest difference from the target value. Total cost for a Base (Unconstrained) scenario generally may be slightly lower than the target cost, since it comprises an ideal scenario that is used to provide a reference point. In this case MinMaxQty scenario is selected as the focal scenario as shown below (refer value in bold text property) in Table 12:

TABLE 12

| Scenario Name | Objective Value | Target | Difference | Units |
|---|---|---|---|---|
| Base (reference) | 1,954,400,000 | 1,955,940,000 | | |
| MinMaxQty | 1,962,100,000 | 1,955,940,000 | 6,160,000 | USD |
| MinQtyMaxSpend | 1,985,272,935 | 1,955,940,000 | 29,332,935 | USD |

Figure 9:
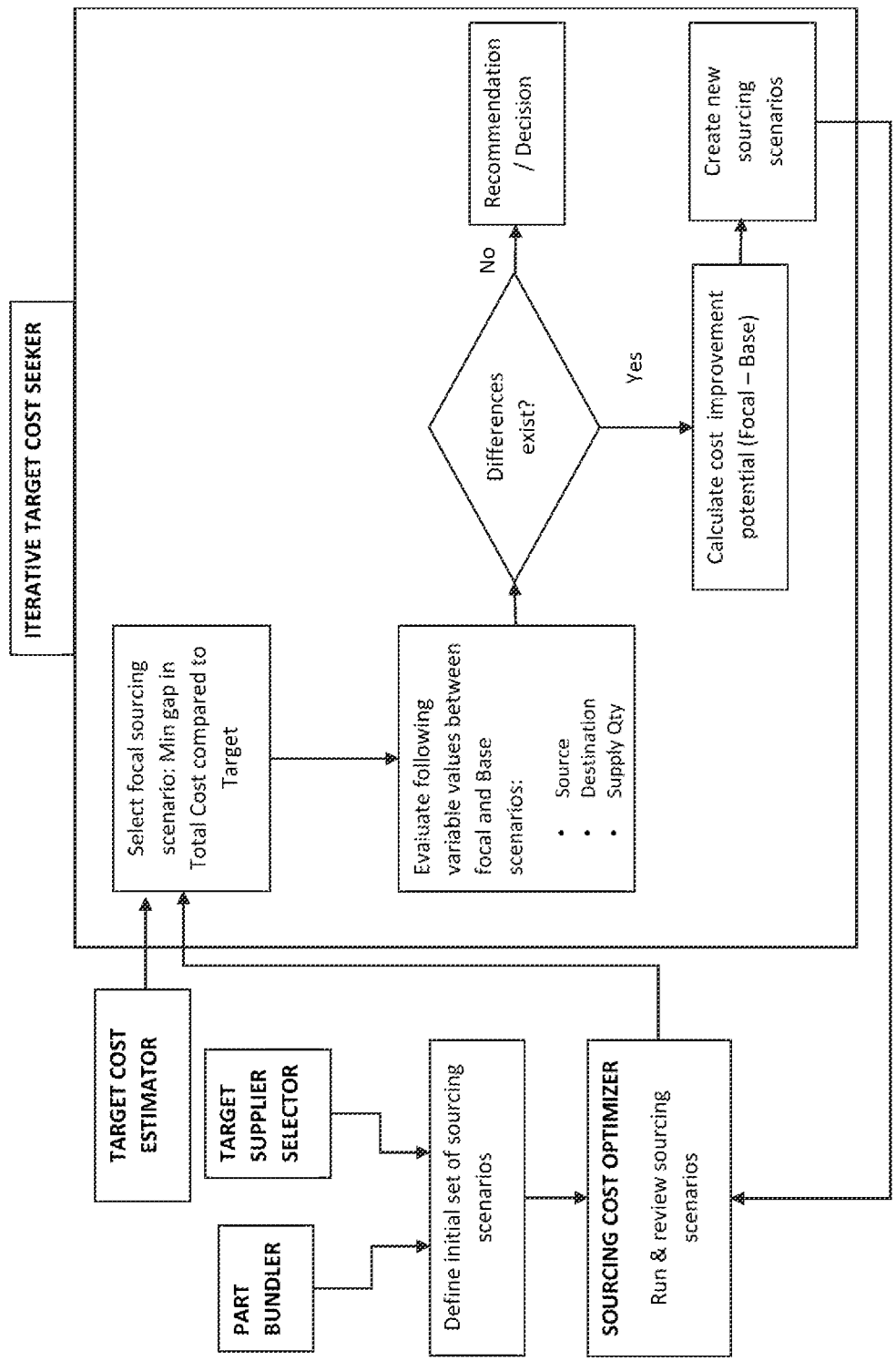
FIG. 9 depicts a block diagram illustrating a process of a method for obtaining a new optimized cost for a focal scenario using the iterative target cost seeker of FIG. 2, in accordance with an embodiment of the present disclosure.

The one or more hardware processors 104 then iteratively perform the following steps, until the optimized total sourcing cost of the focal scenario is less than or equal to the target cost. The steps include identifying one or more potential objective improvements; modifying at least one of (i) cost associated with each part, and (ii) the one or more constraints; and obtaining a new optimized cost for the focal scenario based on the modified cost and the one or more constraints. The above-mentioned steps are carried out by iterative cost seeker as depicted in FIG. 2 and FIG. 9. The above steps can be better understood by way of following description and examples. Once the focal scenario is identified, the system 100 attempts to reduce the total cost further (towards the target) by modifying the inputs. In this case, the higher cost of the focal scenario could be a result of (i) using a supplier with higher unit cost, or (ii) being forced to pick a different supplier due to constraints like MinimumQuantity (MinQty), In order to pinpoint these differences, the output of the focal scenario is compared to Base, as shown below in Table 13:

TABLE 13

| Scenario | Variable | Source | Destination | Entity/Part | Coefficient | Base supply_qty | Base total_value | Focal supply_qty | Focal total_value |
|---|---|---|---|---|---|---|---|---|---|
| Base | $x_1$ | Marina | Detroit | P1 | 980 | 0 | 0 | 0 | 0 |
| Base | $x_2$ | Marina | Indianapolis | P1 | 980 | 0 | 0 | 0 | 0 |
| Base | $x_3$ | Marina | Cleveland | P1 | 1000 | 0 | 0 | 0 | 0 |
| Base | $x_4$ | Marina | St. Louis | P1 | 1040 | 0 | 0 | 0 | 0 |
| Base | $x_5$ | Empire | Detroit | P1 | 970 | 0 | 0 | 0 | 0 |
| Base | $x_6$ | Empire | Indianapolis | P1 | 1010 | 0 | 0 | 0 | 0 |
| Base | $x_7$ | Empire | Cleveland | P1 | 940 | 30000 | 28200000 | 30000 | 28200000 |
| Base | $x_8$ | Empire | St. Louis | P1 | 1060 | 0 | 0 | 0 | 0 |
| Base | $x_9$ | Lakes | Detroit | P1 | 940 | 50000 | 47000000 | 50000 | 47000000 |
| Base | $x_{10}$ | Lakes | Indianapolis | P1 | 930 | 80000 | 74400000 | 80000 | 74400000 |

Given the outputs for various scenarios from the Cost Optimizer and a Target Cost, the Iterative Target Cost Seeker selects the scenario with the closest cost to target and identifies potential opportunities for further cost reduction. For the purposes, three scenarios have been considered, with their total costs along with a predicted target sourcing cost of $1955940000 USD.

The Iterative Target Cost Seeker compares the output of each decision variable (supply_qty) in the focal scenario to the corresponding output from base scenario, and highlights the differences as potential for improvements, as shown below:
Given the focal scenario such as:
Target cost=1957500000
Value tolerance (%)=0.2
The focal scenario is =MinMaxQty
Total cost for focal scenario=1962100000
Percent Difference between Focal Cost and Target Cost=0.23499361430395915
The one or more potential objective improvements being identified include:
Part, Destination, BaseSource, BaseSupplyQty, BaseUnitCost, FocalSource, FocalSupplyQty, FocalUnitCost, UnitCostDiff, TotalCostDiff
P4, Indianapolis, Marina, 100000.0, 1160, Marina, 50000.0, 1160, 0, 0.0
P4, Indianapolis, Marina, 100000.0, 1160, Lakes, 50000.0, 1180, 20, 1000000.0
P4, St. Louis, Marina, 25000.0, 1220, Marina, 15000.0, 1220, 0, 0.0
P4, St. Louis, Marina, 25000.0, 1220, Steelers, 10000.0, 1300, 80, 800000.0
P5, St. Louis, Marina, 30000.0, 1240, Steelers, 30000.0, 1280, 40, 1200000.0
P8, Cleveland, Marina, 140000.0, 1400, Marina, 90000.0, 1400, 0, 0.0
P8, Cleveland, Marina, 140000.0, 1400, Empire, 50000.0, 1470, 70, 3500000.0
P11, St. Louis, Marina, 40000.0, 1160, Marina, 10000.0, 1160, 0, 0.0
P11, St. Louis, Marina, 40000.0, 1160, Steelers, 30000.0, 1200, 40, 1200000.0

The above improvements can be shown through the following example for the demand at Indianapolis for P4 in Table 14.

TABLE 14

| Scenario | Variable | Source | Destination | Entity/Pa{art | Coefficient | Base supply_qty | Base total_value | Focal supply_qty | Focal total_value |
|---|---|---|---|---|---|---|---|---|---|
| Base | $x_{34}$ | Marina | Indianapolis | P4 | 1160 | 100000 | 116000000 | 50000 | 58000000 |
| Base | $x_{38}$ | Empire | Indianapolis | P4 | 1230 | 0 | 0 | 0 | 0 |
| Base | $x_{42}$ | Lakes | Indianapolis | P4 | 1180 | 0 | 0 | 50000 | 59000000 |
| Base | $x_{46}$ | Steelers | Indianapolis | P4 | 1300 | 0 | 0 | 0 | 0 |

The first row shows that in Base scenario, the entire 100K demand was sourced from the least cost supplier, Marina. However, in the focal scenario, only 50K was sourced from Marina, and the remaining 50K was sourced from a different supplier—Lakes—for a $20 higher unit cost. The reason is that there is a 50K MinQty requirement from Lakes. If the quantity sourced from Marina can be increased there is a potential for getting closer to the target with potential cost reduction of (20*50,000)=$1Mn.

Now that the above information is available, there can be negotiations with Lakes to reduce their cost closer to the Base (reference) cost of $1160 or to reduce their MinQty requirement. Either option or a suitable combination helps in reducing the cost. In other words, at least one of (i) cost associated with each part, and (ii) the one or more constraints are modified based on the above available information (e.g., negotiation between entities—business organizations/vendors/suppliers, and the like).

Once the new inputs are determined, a new scenario can be constructed and can be run through source cost optimizer to reduce the total sourcing cost further towards target. In other words, a new optimized cost for the focal scenario may be (or is) obtained based on the modified cost and the one or more constraints as described and shown above. The above step of obtaining the new optimized cost for the focal scenario can be better understood by way of following description:

Example: Assuming a user gets a lower unit cost for P4 from Lake to Indianapolis, where the new cost is $1170 instead of $1180. The re-optimization yields the following result the new optimal total cost as 1961600000. This new optimal total cost is closer to the target value of 1957500000 than the focal scenario's 1962100000. However, since the target is not yet reached, the target seeker recommends making further iterations. The above description can be realized through a block diagram of the iterative target cost seeker as depicted in FIG. 9. More specifically, FIG. 9, with reference to FIGS. 1 through 8, depicts a block diagram illustrating a process of a method for obtaining a new optimized cost for a focal scenario using the iterative target cost seeker of FIG. 2, in accordance with an embodiment of the present disclosure. As can be seen from FIG. 9, following part bundling and target supplier selection, the initial set of scenarios may be processed through an analytics engine, and the total cost metric may be calculated for each of the scenarios to obtain a set of metrics. These collected set of metrics may be compared to the target total cost. Total cost for the Base scenario generally is slightly lower than the target cost, since it comprises an ideal scenario that is used to provide a reference point. One of the initial scenarios (other than Base) may be selected for recommendation or further refinement. This selection is rule-driven, where the rule may comprise "Select the scenario with the least total cost difference with respect to the target cost." The selected scenario is usually called the focal scenario. If the focal scenario's total cost is lower than the target cost, no further refinement may be needed. The system 100 may recommend this as the preferred scenario to the decision makers. If the focal scenario's total cost exceeds the target cost and the pre-defined tolerance, further refinement may be needed. The refinement may be done by modifying the inputs and/or constraints. The scenario's recommended quantities may be compared by category with the Base scenario's recommended quantities. Since the Base provides the ideal scenario, where each demand is sourced from the least cost supplier, any deviation from this case may merit closer scrutiny. These differences are listed as a potential-objective improvement opportunities along with calculated cost of improvement. If there is decision made (e.g., a user decision) to reoptimize, data may be duplicated for the Focal scenario. After obtaining new cost or constraints data; the optimization may be re-run and results ray be compared to the target cost. This process may be repeated till the target cost is reached or the maximum number of iterations are run.

Existing techniques lack effective ways to target best suppliers for right bundle of parts and to systematically negotiate best contract terms for sustained savings. To aggressively take advantage of rapidly changing technologies or available capacity for a critical commodity with constrained choices, embodiments of the present disclosure may provide for targeting a capable supplier and negotiating potentially a multi-year contract with possibly larger volume commitment. Targeting best supplier and creating appropriate sourcing bundle may be further augmented by an Iterative Target Cost Seeker as described herein with structuring clear contract elements on cost, capacity and possibly opportunities addressing complex business demand. Driving such a sourcing contract through systematic negotiation process requires using core parts and supplier related information, with agreement on capacity mix and capability building elements, further executing under uncertain market environments that present technical challenges which is overcome by the system and method of the present disclosure.

Typical sourcing cost of a manufactured product amounts to approximately 65% of Cost of Goods sold. Cost benefits gained through rounds of supplier quotes analysis and negotiation are difficult to sustain due to continually changing customer demand, product offerings, and suppliers' business risks. Manufacturers grow suppliers globally to hunt for the best capacity for meeting emerging technology demands from their products, and even face risks managing cost fluctuations that can directly impact profits or productivity in absence of effective ways to target best suppliers for right bundle of parts and to systematically negotiate best contract terms for sustained savings. To address the above technical problem, embodiments of the present disclosure provide system and method that leverage detailed data about technology and future volume expectations for critical parts for future product portfolio along with clear mix of needs for capacity and capability along with cost structures across supplier locations. Using this data, the system of the present disclosure provides relationships between parts and corresponding capacity opportunities. A part bundler as described herein creates best families of parts with shared technology and estimated total demand while a Target Supplier Selector as implemented by the system herein maps the best supplier locations for selected part bundles. An Iterative Target Cost Seeker uses the Sourcing Cost Optimizer including multiple alternatives, for example, to grow or limit supplier capacity by constraining award amount, bundle mix, or number of suppliers. Further, with the above method of the present disclosure being performed, the system 100 aligns data formats (e.g., attributes of each part, and the way quantities of each part are expressed) for part thus enabling achieving links across corresponding processing and supplier information.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the Ike, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional budding blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an", and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
    receiving, via one or more hardware processors, an input request from one or more entities;
    querying, via the one or more hardware processors, a parts repository based on the input request to identify a plurality of parts;
    applying, via the one or more hardware processors, a Jaccard similarity for each pair of parts from the plurality of parts by calculating a similarity score between each set of parts from the plurality of parts to obtain one or more combinations of a set of similar parts;
    identifying, via the one or more hardware processors, based on the similarity score, at least one corresponding supplier from a suppliers repository and tagging the at least one corresponding supplier to each of the one or more combinations of the set of similar parts;
    performing, via the one or ore hardware processors, a comparison between the similarity score and a threshold;
    identifying, via the one or more hardware processors, based on the comparison, one or more target suppliers from the one or more combinations of the set of similar parts and the at least one supplier;
    determining, via the one or more hardware processors, a sourcing cost for each set of similar parts corresponding to the one or more identified target suppliers based on one or more pre-defined scenarios;
    optimizing, via the one or more hardware processors, a total sourcing cost derived from the sourcing cost for each set of similar parts based on one or more constraints;
    predicting, via the one or more hardware processors, a target cost for subsequent time instances using a Neural Network AutoRegressive with eXogenous input (NNARX) model, wherein the NNARX model comprises of three layers, wherein a first input layer comprises neurons representing historical values of the cost, current and historical values for external driver variables, a final output layer comprises a neuron representing the target cost, and a middle layer comprises neurons configured to compute nodal weights of the NNARX model with a rectified linear activation function, wherein each node of the middle layer is connected to one or more nodes of the input layer and to a node of the output layer, wherein the input request is divided into a training set and a testing set, wherein the NNARX model is used on the testing set to compute predicted cost and a forecast error for the testing data and wherein the NNARX model is used with the forecast error to predict the target cost for the subsequent time instances;
    performing, via the one or more hardware processors, a comparison of (i) the target cost predicted for the subsequent time instances and (ii) the optimized sourcing cost for each of the one or more pre-defined scenarios; and
    identifying, via the one or more hardware processors, a focal scenario from the one or more pre-defined scenarios based on the comparison, wherein the focal scenario serves as an output; and
    iteratively performing, via the one or more hardware processors, until the optimized total sourcing cost of the focal scenario under the target cost with a tolerance value by:
        identifying one or more objective improvements;
        modifying at least one of (i) cost associated with each part, and (ii) the one or more constraints based on the identified objective improvements; and
        obtaining a new optimized cost for the focal scenario based on the modified cost and the one or more constraints.

2. The processor implemented method of claim 1, wherein the one or more pre-defined scenarios comprise at least one of (i) an overall cost reduction for a specific combinatorial set of parts and one or more corresponding target suppliers, (ii) at least one potential supplier identified for fulfilling parts to a specific entity under pre-defined quantity bounds, (iii) at least one potential supplier identified for fulfilling parts to a specific entity at a given spend opportunity, (iv) a maximum number of potential suppliers identified for delivery across entities, or (v) combinations thereof.

3. The processor implemented method of claim 1, wherein the one or more constraints comprise at least one of demand, a maximum quantity of parts, a minimum quantity of parts, a maximum spend, and a number of suppliers.

4. A system, comprising:
    a memory storing instructions;
    one or more communication interfaces; and
    one or more hardware processors coupled to the memory via the one or more communication interfaces, wherein the one or more hardware processors are configured by the instructions to:

receive an input request from one or more entities;
query a parts repository based on the input request to identify a plurality of parts;
apply a Jaccard similarity for each pair of parts from the plurality of parts by calculating a similarity score between each set of parts from the plurality of parts to obtain one or more combinations of a set of similar parts;
identify, based on the similarity score, at least one corresponding supplier from a suppliers repository and tag the at least one corresponding supplier to each of the one or more combinations of the set of similar parts;
perform a comparison between the similarity score and a threshold; identify based on the comparison, one or more target suppliers from the one or more combinations of the set of similar parts and the at least one supplier;
determine a sourcing cost for each set of similar parts corresponding to the one or more identified target suppliers based on one or more pre-defined scenarios;
optimize a total sourcing cost derived from the sourcing cost for each set of similar parts based on one or more constraints;
predict a target cost for subsequent time instances using a Neural Network AutoRegressive with eXogenous input (NNARX) model, wherein the NNARX model comprises of three layers, wherein a first input layer comprises neurons representing historical values of the cost, current and historical values for external driver variables, a final output layer comprises a neuron representing the target cost, and a middle layer comprises neurons configured to compute nodal weights of the NNARX model with a rectified linear activation function, wherein each node of the middle layer is connected to one or more nodes of the input layer and to a node of the output layer, wherein the input request is divided into a training set and a testing set, wherein the NNARX model is used on the testing set to compute predicted cost and a forecast error for the testing data and wherein the NNARX model is used with the forecast error to predict the target cost for the subsequent time instances;
perform a comparison of (i) the target cost predicted for the subsequent time instances and (ii) the optimized sourcing cost for each of the one or more pre-defined scenarios; and
identify a focal scenario from the one or more pre-defined scenarios based on the comparison, wherein the focal scenario serves as an output; and
iteratively perform until the optimized total sourcing cost of the focal scenario under the target cost with a tolerance value by:
identifying one or more objective improvements;
modifying at least one of (i) cost associated with each part, and (ii) the one or more constraints based on the identified objective improvements; and
obtaining a new optimized cost for the focal scenario based on the modified cost and the one or more constraints.

5. The system of claim 4, wherein the one or more pre-defined scenarios comprise at least one of (i) an overall cost reduction for a specific combinatorial set of parts and one or more corresponding target suppliers, (ii) at least one potential supplier identified for fulfilling parts to a specific entity under pre-defined quantity bounds, (iii) at least one potential supplier identified for fulfilling parts to a specific entity at a given spend opportunity, (iv) a maximum number of potential suppliers identified for delivery across entities, or (v) combinations thereof.

6. The system of claim 4, wherein the one or more constraints comprise at least one of demand, a maximum quantity of parts, a minimum quantity of parts, a maximum spend, and a number of suppliers.

7. One or more non-transitory machine-readable information storage mediums comprising one or more instructions which when executed by one or more hardware processors cause a method for bundling of parts, selecting corresponding supplier, and optimizing an overall sourcing cost, the method comprising:
receiving, via the one or more hardware processors, an input request from one or more entities;
querying, via the one or more hardware processors, a parts repository based on the input request to identify a plurality of parts;
applying, via the one or more hardware processors, a Jaccard similarity for each pair of parts from the plurality of parts by calculating a similarity score between each set of parts from the plurality of parts to obtain one or more combinations of a set of similar parts;
identifying, based on the similarity score, at least one corresponding supplier from a suppliers repository and tagging the at least one corresponding supplier to each of the one or more combinations of the set of similar parts;
performing, via the one or more hardware processors, a comparison between the similarity score and a threshold;
identifying, via the one or more hardware processors, based on the comparison, one or more target suppliers from the one or more combinations of the set of similar parts and the at least one supplier;
determining, via the one or more hardware processors, a sourcing cost for each set of similar parts corresponding to the one or more identified target suppliers based on one or more pre-defined scenarios; and
optimizing, via the one or more hardware processors, a total sourcing cost derived from the sourcing cost for each set of similar parts based on one or more constraints;
predicting, via the one or more hardware processors, a target cost for subsequent time instances using a Neural Network AutoRegressive with eXogenous input (NNARX) model, wherein the NNARX model comprises of three layers, wherein a first input layer comprises neurons representing historical values of the cost, current and historical values for external driver variables, a final output layer comprises a neuron representing the target cost, and a middle layer comprises neurons configured to compute nodal weights of the NNARX model with a rectified linear activation function, wherein each node of the middle layer is connected to one or more nodes of the input layer and to a node of the output layer, wherein the input request is divided into a training set and a testing set, wherein the NNARX model is used on the testing set to compute predicted cost and a forecast error for the testing data and wherein the NNARX model is used with the forecast error to predict the target cost for the subsequent time instances;
performing, via the one or more hardware processors, a comparison of (i) the target cost predicted for the subsequent time instances and (ii) the optimized sourcing cost for each of the one or more pre-defined scenarios; and identifying, via the one or more hardware processors, a focal scenario from the one or more pre-defined scenarios based on the comparison, wherein the focal scenario serves as an output; and iteratively performing, via the one or more hardware processors, until the optimized total sourcing cost of the focal scenario under the target cost with a tolerance value by:
- identifying one or more objective improvements;
- modifying at least one of (i) cost associated with each part, and (ii) the one or more constraints based on the identified objective improvements; and
- obtaining a new optimized cost for the focal scenario based on the modified cost and the one or more constraints.

8. The one or more non-transitory machine-readable information storage mediums of claim 7, wherein the one or more pre-defined scenarios comprise (i) an overall cost reduction for a specific combinatorial set of parts and one or more corresponding target suppliers, (ii) at least one potential supplier identified for fulfilling parts to a specific entity under pre-defined quantity bounds, (iii) at least one potential supplier identified for fulfilling parts to a specific entity at a given spend opportunity, and (iv) a maximum number of potential suppliers identified for delivery across entities, or (v) combinations thereof.

9. The one or more non-transitory machine-readable information storage mediums of claim 7, wherein the one or more constraints comprise at least one of demand, a maximum quantity of parts, a minimum quantity of parts, a maximum spend, and a number of suppliers.

* * * * *